US 9,848,626 B2

United States Patent
Shen et al.

(10) Patent No.: US 9,848,626 B2
(45) Date of Patent: Dec. 26, 2017

(54) FOOD GRADE ARABINOXYLAN PRODUCT FROM CORN FIBER

(71) Applicant: Tate & Lyle Ingredients Americas LLC, Hoffman Estates, IL (US)

(72) Inventors: Shiji Shen, Hoffman Estates, IL (US); Andrew Joseph Hoffman, Hoffman Estates, IL (US); Rohit A. Medhekar, Hoffman Estates, IL (US); Susan Matthew, Hoffman Estates, IL (US); Richard Armentrout, Hoffman Estates, IL (US)

(73) Assignee: TATE & LYLE INGREDIENTS AMERICAS LLC, Hoffman Estates, IL (US)

( * ) Notice: Subject to any disclaimer, the term of this patent is extended or adjusted under 35 U.S.C. 154(b) by 0 days.

(21) Appl. No.: 14/774,520

(22) PCT Filed: Mar. 4, 2014

(86) PCT No.: PCT/US2014/020085
§ 371 (c)(1),
(2) Date: Sep. 10, 2015

(87) PCT Pub. No.: WO2014/158774
PCT Pub. Date: Oct. 2, 2014

(65) Prior Publication Data
US 2016/0021920 A1 Jan. 28, 2016

Related U.S. Application Data

(60) Provisional application No. 61/777,353, filed on Mar. 12, 2013.

(51) Int. Cl.
*A23L 1/0534* (2006.01)
*A23L 1/30* (2006.01)
(Continued)

(52) U.S. Cl.
CPC .............. *A23L 1/3002* (2013.01); *A23L 2/52* (2013.01); *A23L 33/105* (2016.08); *C08B 30/10* (2013.01);
(Continued)

(58) Field of Classification Search
CPC ......... A23L 33/105; A23L 2/52; C08B 30/10; C08B 37/0057; A23V 2002/00
(Continued)

(56) References Cited

U.S. PATENT DOCUMENTS 2,801,955 A 8/1957 Rutenberg
6,147,206 A 11/2000 Doner
(Continued)

FOREIGN PATENT DOCUMENTS

WO 2006002495 1/2006
WO 2007120210 10/2007
(Continued)

OTHER PUBLICATIONS

Wang, Bin et al., "Enriched arabinoxylan in corn fiber for value added products", Biotechnol Lett (2008) 30:275-279.*
(Continued)

*Primary Examiner* — Helen F Heggestad
(74) *Attorney, Agent, or Firm* — RatnerPrestia

(57) ABSTRACT

A food grade water-soluble arabinoxylan product containing arabinoxylan oligosaccharides and retaining a high amount of bound ferulic acid and other phenolic substances is isolated from corn fiber using an aqueous extraction wherein the pH of the aqueous medium employed for the extraction is adjusted to a selected value after mixing with the corn fiber and prior to the initiation of extraction.

11 Claims, 6 Drawing Sheets

(51) Int. Cl.
*C08B 30/10* (2006.01)
*C08B 37/00* (2006.01)
*A23L 2/52* (2006.01)
*A23L 33/105* (2016.01)

(52) U.S. Cl.
CPC ........ *C08B 37/006* (2013.01); *C08B 37/0057* (2013.01); *A23V 2002/00* (2013.01)

(58) Field of Classification Search
USPC ................ 426/590, 520, 578, 431, 436, 441
See application file for complete search history.

(56) References Cited

U.S. PATENT DOCUMENTS

| | | | | |
|---|---|---|---|---|
| 6,388,069 | B1* | 5/2002 | Buchanan | A23D 9/007 435/74 |
| 2008/0102162 | A1 | 5/2008 | Delcour | |
| 2012/0135957 | A1* | 5/2012 | Dugenet | A23L 2/52 514/54 |

FOREIGN PATENT DOCUMENTS

| | | |
|---|---|---|
| WO | 2008000050 | 1/2008 |
| WO | 2008087167 | 7/2008 |
| WO | 2008098320 | 8/2008 |
| WO | 2013006712 | 1/2013 |

OTHER PUBLICATIONS

Allerdings, E. et al., "Isolation and structural identification of complex feruloylated heteroxylan side-chains from maize bran," Phytochemistry, vol. 67, No. 12, Jun. 1, 2006, pp. 1276-1286.

Dien, B.S. et al., "Enzymatic saccharification of hot-water pre-treated corn fiber for production of monosaccharides," Enzyme and Microbial Technology, vol. 39, 2006, pp. 1137-1144.

International Preliminary Report on Patentability dated Sep. 15, 2015 for International Application No. PCT/US2014/020085.

International Search Report for International Application No. PCT/US2014/020085 dated Jun. 4, 2014.

Koell, P. et al., "Degradation of Maize Hulls with Water in a Flow Reactor," Starch, vol. 39, 1987, pp. 13-16.

Mosier, N. et al., "Industrial Scale-Up of pH-Controlled Liquid Hot Water Pretreatment of Corn Fiber for Fuel Ethanol Production," Applied Biochemistry and Biotechnology, vol. 125, 2005, pp. 77-97.

Rose, D.J. and Inglett, G.E., "Production of feruloylated arabinoxylo-oligosaccharides from maize (*Zea mays*) bran by microwave-assisted autohydrolysis," Food Chemistry, vol. 119, 2010, pp. 1613-1618.

Shibanuma, K. et al., "Partial Acid Hydrolysis of Corn Fiber for the Production of L-Arabinose," J. Appl. Glycosci., vol. 46, No. 3, 1999, pp. 249-256.

Weil, J.R. et al., "Pretreatment of Corn Fiber by Pressure Cooking in Water," Applied Biochemistry and Biotechnology, vol. 73, 1998, pp. 1-17.

* cited by examiner

FOOD GRADE ARABINOXYLAN PRODUCT FROM CORN FIBER

CROSS-REFERENCE TO RELATED APPLICATION

This application is the national phase of International (PCT) Application No. PCT/US2014/020085, filed Mar. 4, 2014, which claims the benefit of U.S. Provisional Application No. 61/777,353, entitled "FOOD GRADE ARABINOXYLAN PRODUCT FROM CORN FIBER" filed Mar. 12, 2013, the contents of each of which are incorporated herein by reference in their entirety and for all purposes.

FIELD OF THE INVENTION

The present invention relates to methods for extracting an arabinoxylan oligosaccharide-containing product from corn fiber under mild hydrolysis conditions. The product thereby obtained is suitable for use as a food ingredient and may contain relatively high amounts of bound antioxidant components.

BACKGROUND OF THE INVENTION

The wet milling of corn in the United States of America produces over 4 million tons of corn fiber each year. To date, this corn fiber has been used in animal feed applications, at least in the United States. Corn fiber comprises, among other things, arabinoxylan, which is also referred to as hemicellulose and corn fiber gum. Arabinoxylan derived from corn potentially has commercial value far exceeding its use in animal feed applications. For example, it is believed that corn arabinoxylan may be used as a replacement for gum arabic in applications such as beverage flavor emulsification. Additionally, it is believed that corn arabinoxylan may be useful in applications such as film formation, thickening, emulsification, and stabilization of aqueous solutions and suspensions. Further, it is known that including corn arabinoxylan and its limited hydrolysis products, the arabinoxylan oligosaccharides (AXOS), in foods and beverages may yield health benefits such as increased absorption of calcium and magnesium, reduced cholesterol absorption, lowered plasma cholesterol, decrease cholesterol accumulation in the liver, and desirable bifidogenic effects.

In view of the number of possible relatively high value applications for corn arabinoxylan, it is no surprise that processes for extracting arabinoxylan (and arabinoxylan oligosaccharides in particular) from corn fiber on a commercial scale have been and continue to be the subject of investigation and development activities.

Arabinoxylan is an polysaccharide having a backbone repeat unit of [β-(1,4)-D-xylopyranose]. Partial hydrolysis of arabinoxylans can yield arabinoxylan oligosaccharides, which are sometimes referred to by the acronym "AXOS." The arabinoxylan backbone is substituted with, inter alia, arabinose side chains, with a portion of the arabinose side chains being esterified with phenolic compounds, in particular phenolic acids such as coumaric acid and ferulic acid (e.g., one or two phenolic acid moieties may substituted on a single xylose repeat unit of the backbone). Ferulic acid is an aromatic compound with potent antioxidant activity and known human health benefits. Other phenolic acids present in bound form in arabinoxylan such as coumaric acid are also believed to have activity as antioxidants. It would be desirable to develop efficient methods for generating AXOS from corn fiber which leave the ferulic acid and other phenolic substituents on the AXOS backbone largely intact, i.e., still chemically bound to the oligosaccharide. The bound ferulic acid residues in the AXOS could provide sustained release of antioxidants during digestion of the AXOS in the digestive tract following consumption of an article such as a food product containing the AXOS. The arabinoxylan polysaccharides in corn fiber are tough, gummy, high molecular weight substances that are covalently crosslinked (through the ferulic acid ester substituents) both to themselves and to lignin structures in the corn fiber. Extracting arabinoxylan oligomers in soluble form from the corn fiber generally involves a cleavage of the covalent bonds involved in such crosslinking. However, previously developed methods for the extraction of arabinoxylan oligomers under alkaline conditions have tended to also cleave the ferulic acid esters substituted on the arabinose side chains of the polysaccharide backbone. Such methods thus result in the loss of a substantial fraction of the bound ferulic acid. Additionally, alkaline extraction is not very effective and introduces salts and color into the extract which are difficult to remove. Acid treatment methods for extracting arabinoxylan oligomers from corn fiber are also known, but such methods significantly degrade the arabinoxylan oligosaccharides and therefore require close control of the process parameters (e.g., amounts of acid and corn fiber, temperature). Such methods also often generate relatively large amounts of mono- and disaccharides, thereby reducing the yield of the desired arabinoxylan oligosaccharides. The residual acid in the extract also must be neutralized, generating salts which typically must be removed to make the extract suitable for use as a food grade ingredient.

BRIEF SUMMARY OF THE INVENTION

One aspect of the invention provides a method of isolating a food grade arabinoxylan product from corn fiber, wherein the method comprises in sequential order the steps of a) mixing corn fiber with an aqueous medium to form an aqueous mixture of corn fiber (i.e., a mixture of corn fiber and aqueous medium), b) measuring the pH of the aqueous mixture of corn fiber, c) determining whether the measured pH of the aqueous mixture of corn fiber corresponds to a preselected initial pH value, d) if the measured pH does not correspond to the preselected initial pH value, adding an amount of acid or base to the aqueous mixture of corn fiber effective to bring the measured pH into correspondence with the preselected initial pH value, e) heating the aqueous mixture of corn fiber for a time and at a temperature effective to extract arabinoxylan oligosaccharide into the aqueous medium from the corn fiber such that at least 50% of the ferulic acid extracted into the aqueous medium is covalently bonded to the arabinoxylan oligosaccharide, and f) separating the aqueous medium containing extracted arabinoxylan from the corn fiber. No by-products or treatment agents need to be removed from the water-soluble extraction product thereby obtained, which is generally suitable for use as a food ingredient.

Another aspect of the invention provides a food grade arabinoxylan-containing extract from a corn fiber source comprising at least 60 weight % arabinoxylan oligosaccharides on a dry solids basis, wherein the arabinoxylan oligosaccharides contain in bound form at least 50% of the ferulic acid present in the food grade arabinoxylan-containing extract. The extract thus may have an advantageously high oligomer content (e.g., a content of DP3 and higher oligosaccharides of 60-75% by weight, on a dry solids basis), low color and high bound antioxidant content.

Figure 1:
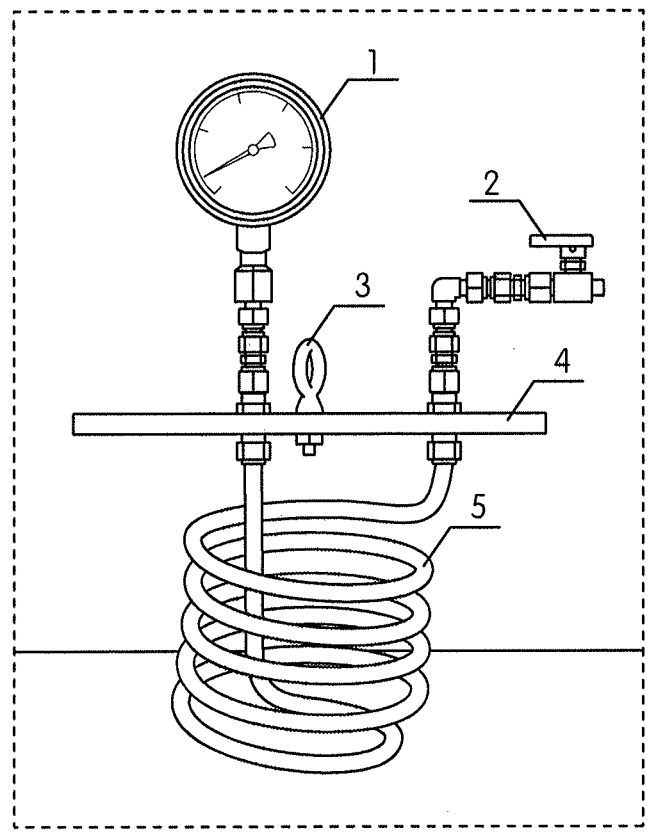
FIG. 1 shows a tubular reactor useful for practicing the process of the present invention.

The Figures are described in more detail in the Examples.

DETAILED DESCRIPTION OF THE INVENTION

The present invention is directed, at least in part, to a process of separating one or more components of corn fiber, which contains a matrix comprised of arabinoxylan (hemicellulose), cellulose, and lignin. Although not required, in one embodiment of the present invention the corn fiber source material is destarched corn fiber.

Advantageously, using destarched corn fiber typically results in the product of the process having a higher percentage of fiber, which tends to make the end product more desirable as a food ingredient. That said, if one is not concerned whether a product produced by the process of the present invention comprises a significant amount of starch or hydrolyzed starch (e.g., where the product is intended for use in a fermentation process for the production of ethanol), then using non-destarched corn fiber may be desirable. Further, the destarched corn fiber used in the process of the present invention may be destarched according to any applicable process of destarching such as with enzymes, water washing, and combinations thereof. In view of the foregoing, it should be understood that corn fiber, destarched corn fiber, and any degree of partially destarched corn fiber may be used in the process of the present invention. For example, in various embodiments of the invention, the corn fiber used may have a starch content of not more than about 20% by weight, not more than about 15% by weight, not more than about 10% by weight, or not more than about 5% by weight, on a dry solids (DS) basis. Corn fiber flakes may be directly used in the process of the present invention after destarching without any further treatment, such as drying and/or grinding.

More particularly, the process of the present invention comprises contacting corn fiber with an aqueous medium having a preselected initial pH value. During the extraction step of the process, the mixture of corn fiber in the aqueous medium tends to become more acidic as the extraction progresses, particularly where the pH initially is above 4. This is believed to be due to the generation of acidic products as a result of certain reactions which take place as the extraction progresses. For example, the pH at the beginning of the extraction may be about 6, with the pH value dropping to about 4 over the course of the extraction. Generally speaking, no matter what the initial pH is (within the range of from about 4 to about 9, at least), the pH of the aqueous medium once the bulk of the arabinoxylan has been extracted from the corn fiber typically ends up within the range of about 3.5 to about 4.5 (assuming no acidic or basic substances are introduced into the aqueous medium during the extraction step). It has now been discovered, however, that the initial pH value significantly affects the characteristics of the extracted arabinoxylan product which is obtained. Different commercial source may also vary in pH over time. For these reasons, the pH of a corn fiber/aqueous medium mixture used as a feed to an arabinoxylan extraction process may not be constant in an industrial operation and may be quite different from day-to-day and/or batch-to-batch. This variability has been found to interfere with the production of extracted arabinoxylan oligosaccharides, of high quality and consistency. Clearly, particularly where the extracted arabinoxylan product is intended for use as an ingredient in consumable articles, such fluctuations in the properties of the product obtained are undesirable. This problem may be addressed by mixing the corn fiber with the aqueous medium, measuring the pH of the resulting mixture, and then, if the measured pH does not correspond to the desired preselected initial pH value, adding acid or base to the mixture such that the measured pH does match the preselected initial pH value.

The preselected initial pH value may range from somewhat acidic to somewhat basic, depending upon the characteristics of the extracted arabinoxylan product which are desired. For example, the preselected initial pH value may be at least 3 or at least 4. The maximum pH value may initially be, for example, 10, 9, 8, 7 or 6. In various embodiments of the invention, the preselected initial pH value may be about 3 to about 10 or about 4 to about 6.

Figure 5:
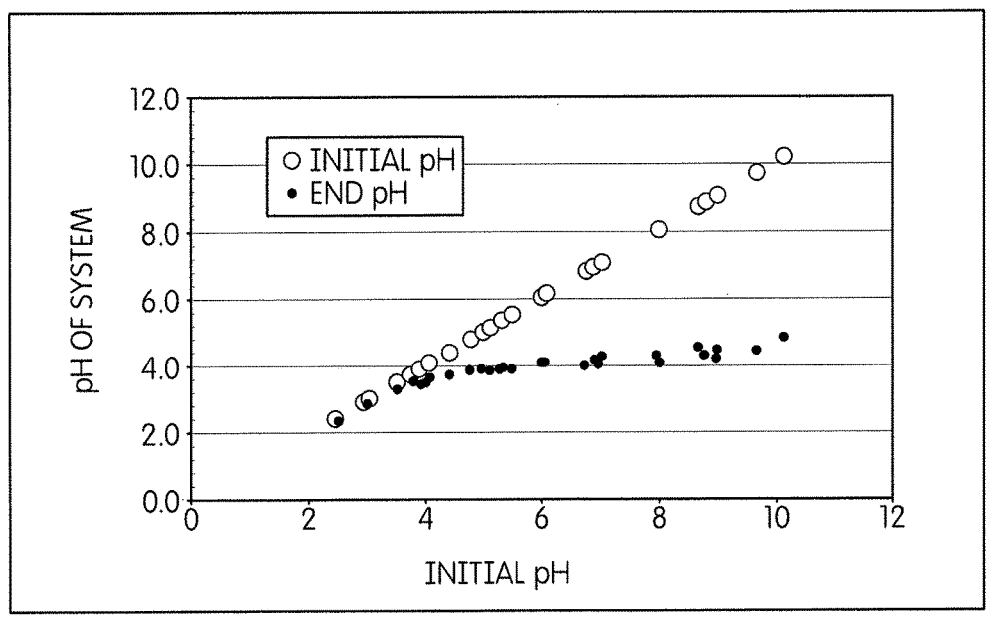
FIG. 5 shows the relationship between initial pH and final pH, under certain illustrative extraction conditions.

In one embodiment of the invention, the extraction (which involves partial hydrolysis of the arabinoxylan polysaccharide present in the corn fiber) takes place under mild conditions in the presence of a very small amount of acid or base. As shown in FIG. 5, which illustrates the relationship between initial and final pH under representative extraction conditions, the pH over the course of the extraction generally does not stay at a particular fixed value. Whatever initial pH value is selected, the reaction mixture following extraction is typically weakly acidic due to acid generation during the extraction and the weak buffer capacity of the reaction mixture. Either acid or base may function as the catalyst for the desired hydrolysis reaction. The use of a very low concentration of acid or base helps ensure that the hydrolysis reaction/extraction is carried out under the desired mild conditions.

Additionally, as will be further demonstrated in the Examples, the initial pH value has significant effects on both the speed (rate) of the hydrolysis reaction as well as the properties of the product thereby obtained. The variation of pH over the course of extraction under mild hydrolysis conditions is one of the major features of the present invention as compared to corn fiber extraction techniques described in the prior art.

The pH value of the aqueous medium once it is admixed with the corn fiber may be measured and monitored using any suitable analytical method known in the art. One such suitable method, for example, is the use of a pH meter.

The acid(s) and base(s) used to adjust the pH of the aqueous medium/corn fiber mixture to achieve the preselected initial pH may be selected from any suitable adds and bases, with such selection being based upon (among other factors) the difference between the measured pH and the preselected initial pH. Suitable acids include, without limitation, organic as well as inorganic acids such as phosphoric acid, hydrochloric acid, citric acid, malic acid, acetic acid and other carboxylic acids. It may be advantageous, in certain embodiments of the invention, to employ weak acids, particularly weak acids acceptable for use in food products such as citric acid and malic acid. Combinations of different acids may be utilized. Suitable bases include, without limitation, inorganic bases such as ammonium hydroxide, sodium hydroxide, sodium carbonate and the like and combinations of different bases. In one embodiment, the base combined with the corn fiber/aqueous medium mixture to adjust the measured pH of the mixture to the preselected pH value is a dilute aqueous solution of sodium hydroxide.

The amount of acid or base needed to attain the desired preselected initial pH value will vary depending upon several factors, including, for example, the inherent acidity or basicity of the mixture of aqueous medium and corn fiber as well as the type of acid or base being used for the pH adjustment. Generally speaking, however, not more than 0.1% by weight of the acid or base, based on the weight of the corn fiber/aqueous medium mixture is utilized. For example, in a typical corn fiber/aqueous medium mixture, 0.026% by weight of phosphoric acid or 0.05% by weight of malic acid would bring the pH of the mixture to 4, while the addition of 0.03% sodium hydroxide would adjust the pH to 7.

An advantage of the process of the present invention is that no catalyst or reagent needs to be present during the extraction step, other than such small amounts of acidic or basic substances that may be present already in the corn fiber or aqueous medium or that may be added to adjust the measured pH to the desired preselected initial pH value as described herein. Thus, in one aspect of the invention, the corn fiber/aqueous medium mixture is not treated or combined with any catalyst or reagent other than the pH adjusting agent, if any, used to achieve the preselected initial pH prior to the initiation of extraction. In another aspect of the invention, no catalyst or reagent is added to the corn fiber/aqueous medium mixture during the course of the extraction step.

Regarding the water in the aqueous medium, any suitable variety may be utilized in accordance with the present invention. That said, in the event the extracted arabinoxylan oligosaccharide-containing product is to be used as a food ingredient, deionized or distilled water is typically preferred.

The extraction mixture of corn fiber and aqueous medium should comprise at least enough aqueous medium to wet and suspend the amount of corn fiber that is to be treated. That said, it is not believed that the ratio of aqueous medium to corn fiber is overly critical. In fact, it is believed that the process of the present invention may be performed with an extraction mixture for which the ratio of aqueous medium to corn fiber may be within a relative wide range. For example, in one embodiment of the present invention, the process is controlled so that the extraction mixture has a weight ratio of corn fiber to aqueous medium that is in the range of about 1:100 to about 60:100. In another embodiment, the extraction mixture has a weight ratio of corn fiber to aqueous medium that is in the range of about 3:100 to about 20:100. It should be noted that corn fiber generally has a strong capability to absorb water. Fiber with 60% water can be treated like a solid, and fiber containing 80% water is like paste. The reaction/extraction in accordance with the present invention could be performed with 20% or higher corn fiber solids, but extra water would be required to "wash" out the soluble product thereby obtained.

One advantage of the present process is that it is not necessary to closely control the concentration of corn fiber in the aqueous medium, as the results obtained are not particularly sensitive to the specific dry solids content of the corn fiber/aqueous medium extraction mixture. This is in contrast to at least certain previously known corn fiber extraction methods, which require careful control of the ratio of catalyst and/or reactants to the amounts of aqueous medium or corn fiber being used.

As mentioned above, the process of the present invention comprises solubilizing at least a portion of the arabinoxylan present in corn fiber, converting the arabinoxylan polysaccharide into water-soluble arabinoxylan polysaccharides (AXOS). Without wishing to be bound by theory, it is believed that such solubilization is made possible by the breaking of linkages between the arabinoxylan and the lignin component of the corn fiber via hydrolysis as well as some cleavage of the polysaccharide backbone, thereby dissolving the resulting solubilized arabinoxylan oligomers into the aqueous medium. At the same time, however, the extraction conditions are selected and controlled so that the phenolic moieties having potential antioxidant properties which are bound to the arabinoxylan as it is present in the unextracted corn fiber largely remain intact in the extracted arabinoxylan. That is, the extent of cleavage of phenolic substituents such as ferulic acid and coumaric acid on the arabinoxylan is limited. Thus, in various embodiments of the invention, the extracted arabinoxylan product contains in bound form at least 50%, at least 60%, at least 70%, at least 80%, at least 90% or at least 95% of the ferulic acid which is extracted into the aqueous medium. Correspondingly, free ferulic acid represents, in various embodiments of the invention, not more than 50%, not more than 40%, not more than 30%, not more than 20%, not more than 10%, or not more than 5% of the total amount of ferulic acid present in the extract (free+bound). A suitable method for measuring the amounts of phenolics, both bound and free, in extract products obtained in accordance with the present invention is described in the Examples.

Extraction of arabinoxylan into the aqueous medium may be accelerated by heating the mixture of corn fiber and aqueous medium. At the same time, however, excessively high extraction temperatures should be avoided in order to reduce color in the extracted product and the generation of unwanted or undesirable degradation products. Generally speaking, extraction temperatures of from about 95° C. to about 200° C. will typically be suitable, with the preferred extraction temperature being to at least some extent dependent upon how the extraction process is conducted. For example, in a batch process extraction temperatures of from about 130° C. to about 160° C. or from about 135° C. to about 150° C. may be preferred, whereas in a continuous extraction the temperature may be about 165° C. or higher, about 170° C. or higher, or about 180° C. or higher. Extraction temperatures in excess of 200° C. may also be suitable, with the desired extent of reaction/extraction being potentially obtainable within shorter times due to the higher rate of reaction as compared to carrying out the process at lower temperatures. It is expected that initial pH and yield will exhibit similar effects on product quality at higher temperatures as are observed at lower processing temperatures.

Similarly, the duration that the extraction mixture is at the selected extraction temperature or within the selected extraction temperature range will depend upon how much of the arabinoxylan in the corn fiber is desired to be extracted into the aqueous medium, which in turn depends, at least in part, on the extraction temperature(s) selected. In general, the higher the extraction temperature the faster bonds between and within constituents of the corn fiber are broken via hydrolysis. In general, the longer the corn fiber/aqueous medium mixture is heated, the more arabinoxylan from the corn fiber is dissolved in the aqueous medium, thereby increasing the overall yield of solubilized extraction product (including extracted arabinoxylan oligosaccharides). But the longer the duration of heating, the greater the amount of mono- and disaccharide in the solubilized extraction product and the lower the amount of bound ferulic acid and other phenolic substances in the arabinoxylan oligosaccharides. Thus, a practitioner of the process of the present invention will select values for the aforementioned extraction variables, including initial pH, time and temperature, that result in the desired outcome.

The determination of such values may be based upon the information disclosed herein, through routine testing, or both, and is straightforward to one of ordinary skill in the art. In one embodiment of the present invention, the extraction mixture is heated for a time that is in the range of about 1 minute to about 500 minutes.

Although not required, after the desired amount of extraction of arabinoxylan from the corn fiber has occurred, it is often desirable to quench the extraction by lowering the temperature of the aqueous medium relatively quickly in order to minimize the excessive depolymerization of the arabinoxylan oligomer that is extracted from the corn fiber and dissolved in the aqueous medium. Such relatively quick decrease in temperature along with the heating of the aqueous medium/corn fiber mixture may be accomplished by any appropriate manner such as using a jacket to add or remove heat from an extraction vessel or other apparatus containing the corn fiber/aqueous medium mixture by flowing hot water, steam, tap water, or chilled water therethrough or by using electric heating coils or functional fluid lines or the like.

The extraction technology described herein may be practiced using essentially any tank, tubular reactor, or other such system, provided the necessary operational parameters are adjusted accordingly. Pressurized processing equipment may be employed. The process of the present invention may be conducted in a batch or continuous manner. For example, the extraction mixture of aqueous medium and corn fiber may be heated, following the measurement and adjustment, if needed, of the initial pH, to the desired extraction temperature or to within the desired extraction temperature range (e.g., 165° C. to 200° C.) by directing the mixture through a zone at a temperature capable of raising the temperature of the mixture to the desired extraction temperature or to within the desired extraction temperature range so that the residence time of any portion of said mixture at the desired extraction temperature or desired extraction temperature range is from about 1 to about 60 minutes. After exiting this heated zone, the mixture may then be directed through a cooling or quench zone to lower the temperature of the mixture and/or a separation zone wherein the aqueous medium containing the solubilized arabinoxylan oligomers is separated from the insoluble residues of the corn fiber. Optionally, the mixture exiting the heated zone may be recycled back through the heated zone one or more times before being subjected to a cooling and/or separation step.

As mentioned above, the process of the present invention also comprises separating the extraction mixture following an extraction step into a soluble fraction comprising dissolved arabinoxylan oligosaccharides and an insoluble fraction comprising insoluble portions of the corn fiber such as cellulose and lignin. This may be accomplished by any appropriate manner such as filtration or centrifugation.

Although not required, if desired, the separated insoluble fraction comprising the residual corn fiber (e.g., cellulose and lignin) may be dried by any appropriate manner such as oven drying or drying with blown air, which may be heated. Additionally, if desired, the separated soluble fraction may also be treated to evaporate the solvent (e.g., water) to yield a dried soluble fraction that comprises solid arabinoxylan oligomers that were previously dissolved. The evaporation of the solvent may be accomplished by any appropriate manner such as spray drying, freeze drying, or oven drying. Alternatively, evaporation of the solvent may be carried out only to the extent needed to provide a more concentrated syrup of the soluble fraction.

As mentioned above, the process of the present invention may be performed to control the amount of soluble material, including arabinoxylan oligosaccharides (considered herein to include water-soluble oligomeric saccharides having a degree of polymerization, DP, of 3 or higher), that is extracted or separated from corn fiber. Further, as mentioned above, in certain embodiments of the present invention the process is performed on destarched corn fiber. By way of example, in such embodiments, the process may be performed so that the dissolved arabinoxylan oligosaccharide content of the soluble fraction is at an amount that is at least 50%, at least 60%, at least 70%, at least 80%, or at least 90% by weight of the non-volatile substances (solids) dissolved in the soluble fraction. The balance of the extracted product may comprise other substances such as mono- and di-saccharides. If so desired, such other substances may be separated from the arabinoxylan oligosaccharides (DP greater than or equal to 3) by known methods such as chromatography, nanofiltration or membrane treatment.

In one aspect of the invention, the extraction conditions (initial pH value, extraction temperature, extraction heating time, etc.) are selected so as to provide an extracted arabinoxylan product having low color. For example, the extracted arabinoxylan product may have a Color Grade of 50 or less, 40 or less, 30 or less, 20 or less, or 10 or less, as measured at a 3% by weight solids level in water solution using the procedure described in the Examples.

In various embodiments of the invention, the extracted product may contain at least about 60% by weight and/or not more than about 75% by weight, on a dry solids basis, of oligosaccharides having degrees of polymerization of from 3 to 120 (e.g., the product may contain 60% to 75% by weight on a dry solids basis of DP3 to DP120 oligosaccharides).

The extracted arabinoxylan oligosaccharide-containing product of the present invention may be utilized as a prebiotic in a variety of type of food products, such as dairy products (e.g., yogurt, dairy beverages), soups, dressings, baked goods (including breads in particular), and alcoholic beverages such as light beer. The product also has utility as an ingredient, in combination with one or more other food or beverage ingredients, in other types of consumable articles.

EXAMPLES

Measurement of Phenolics:

A procedure was developed to isolate all phenolics and specifically quantify antioxidant compounds (free and cell-wall bound phenolics, namely ferulic acid and p-coumaric acid) from corn fiber extract samples by alkaline hydrolysis followed by solvent extractions. The amounts of antioxidant compounds released in the samples were determined by mass spectrometric methods, namely, High Pressure Liquid Chromatography-Quadrupole Time of Flight Mass Spectrometry (HPLC-Q-TOF MS) and/or High Pressure Liquid Chromatography-Tandem Mass Spectrometry (HPLC-MS/MS).

Isolation of Free Phenolics:

In general, free phenolics from AXOS sample solutions can be extracted either by liquid-liquid extraction or by solid-phase extraction (SPE).

Method 1

1 mL of an AXOS sample solution and 5 mL of ethyl acetate (EtOAc) were combined and the organic layer extracted. This process was repeated 5 more times. The combined organic layer was evaporated to dryness, and free phenolics reconstituted in 1 mL MeOH and analyzed by LC-MS.

Method 2

1 ml of an AXOS sample solution was evaporated to half volume under $N_2$. The sample solution was then loaded onto pre-equilibrated SPE C18 cartridges and subsequently eluted with water, followed by gradients of MeOH in water. The eluents consisting of free phenolics were combined, dried and reconstituted in 1 mL MeOH and analyzed by LC-MS.

Isolation of Total (Free+Bound) Phenolics:

1 mL of an AXOS sample solution was allowed to react with 2N NaOH (1 to 3 mL) at room temperature with vigorous shaking for several hours (e.g., 2 to 24 hours).

The resultant hydrolyzate was neutralized to pH 5 to 7 with an appropriate amount of 2N HCl.

The phenolics could be extracted by either of the above described methods 1 or 2. The phenolics could also be extracted by evaporating the solution to complete dryness and solubilizing with MeOH. Alternatively, the phenolics could also be analyzed as they are from aqueous phase without extraction.

The concentrations of ferulic acid and coumaric acid released from AXOS samples can be quantified using HPLC-MS methods (Electrospray negative ion (ESI) mode combined with Selected Ion Monitoring (SIM) scan type).

Determination of Bound Phenolics: Difference between total phenolics and free phenolics [(Total Phenolics)−(Free Phenolics)].

Measurement of Color:

The color of an arabinoxylan-containing extract obtained in accordance with the present invention may be determined using the following procedure. A extract is prepared to a standard solids concentration (3% by weight) in water. The UV absorption of the sample is measured at 450 nm and 600 nm using a UV meter. The color grade is calculated using the following equation:

Color Grade=50*(Reading at 450 nm−Reading at 600 nm)

Samples with different Color Grades were dried and visually observed. It was found the samples with Color Grades less than 50 led to yellow solids when dried. A sample having a Color Grade less than 50 was found to be generally acceptable (i.e., further decoloration was not considered to be necessary for the sample to be satisfactory for use as a food ingredient).

Vetter's corn fiber was destarched and used in the preparation of arabinoxylan oligosaccharide-containing extracts as described below. The destarched corn fiber was combined with water to provide mixtures containing 8-10% by weight destarched corn fiber (on a solids basis).

Figure 4:
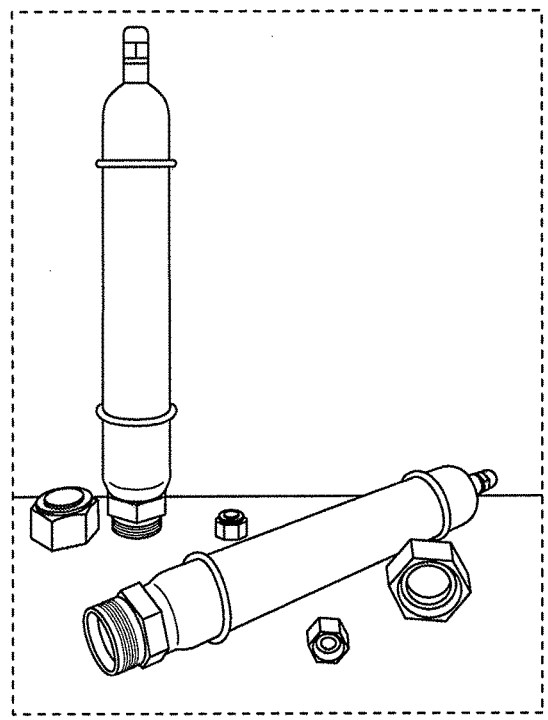
FIG. 4 shows a cylinder reactor useful for practicing the process of the present invention.

Two types of reactor were used in the experiments described herein: a tubular reactor (illustrated in FIG. 1) and a cylinder reactor (illustrated in FIG. 4).

For determining the relationship between temperature and reaction speed, the tubular reactor was used for accurate temperature control, especially for temperatures over 165° C. When the tubular reactor was used, corn fiber was ground to a powder of about 1 mm in size. The results indicated that a continuous (tubular) process would be preferred in commercial production using the present invention since at a high temperature, reaction (extraction) would be very quick. For example, the reaction will generally be finished in minutes at 185° C. and thus, the mixture of corn fiber and aqueous medium needs to be heated up from ambient temperature to 185° C. within a minute, preferably within seconds. Such rapid temperature increases are typically not possible using conventional batch processing equipment. The data in FIG. 3 were generated using this tubular reactor.

Figure 2:
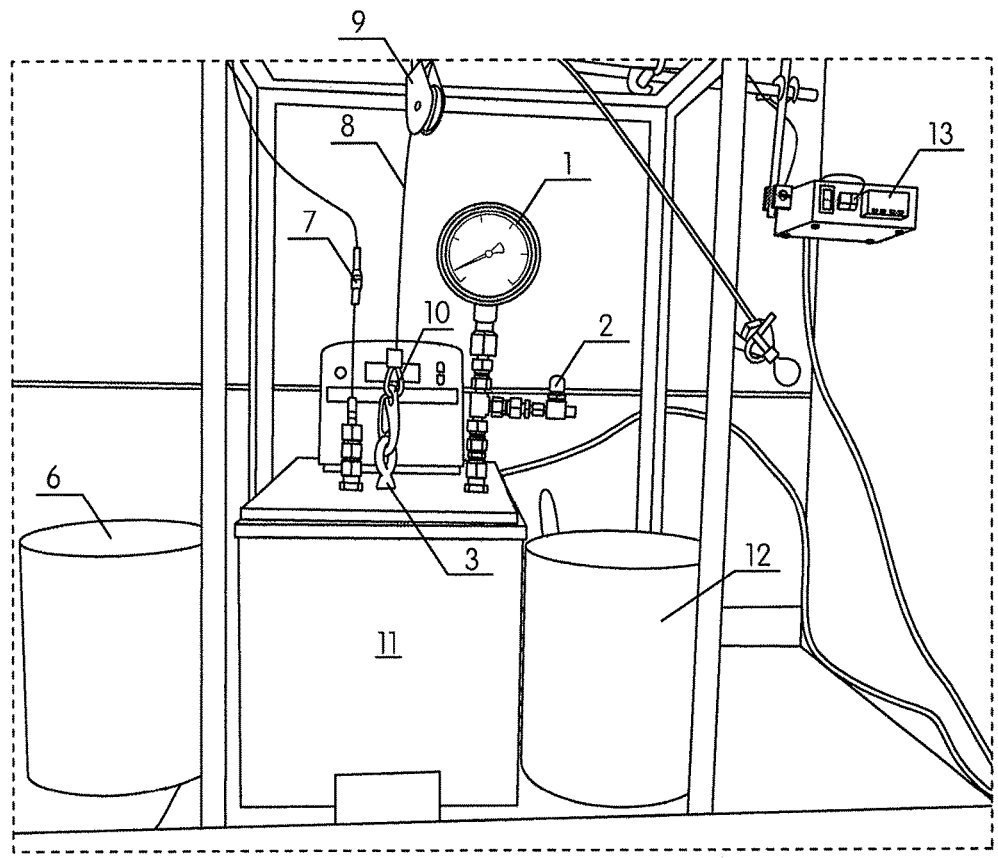
FIG. 2 shows the ancillary equipment employed in connection with the tubular reactor of FIG. 1.

Details of the experimental procedure were as follows:
(1) Mix 13 g powdered corn fiber with 200 g of DI water in a 400-ml beaker.
(2) Adjust to pH 4 with 30% citric acid solution.
(3) Fill into the reactor and attach pressure gauge and relief valve to it.
(4) Fill high pressure compressed air (about 80 psi) into the reactor through the relief valve.
(5) Close the relief valve. If the pressure is unchanged after 15 minutes, release the air and close the valve. (If not, check the connections and fix the leak and test again until a perfect seal is reached.)
(6) Slowly submerge the reactor into the hot bath by a Snatch-Rope-Hook mechanism (FIG. 2).
(7) Record the pressure change.
(8) After the designed time period, raise the reactor from the hot bath and drop it immediately into an ice-water bath.
(9) After the pressure drops to around zero, open the relief valve and remove the reactor from the bath.
(10) Disconnect the pressure gauge and relief valve and discharge the product into a weighed beaker.
(11) Weigh the product.
(12) Filter the product using a Buchner funnel with #1 filter paper.
(13) Disperse the fiber cake on the Buchner funnel into 400-ml water and stir it for about 10 minutes and filter it again.
(14) Measure the solid contents of $1^{st}$ and $2^{nd}$ filtrate using a forced-air oven at 105° C. for 1.5 hours.
(15) Add the insoluble cake in a weighed stainless steel pan and dry it at 105° C. for 1.5 hours.
(16) Weigh the pan again to calculate the weight of insoluble material (fiber).
(17) Calculate the yield by the solids content of $1^{st}$ filtrate and verify it by mass balance.

Figure 3:
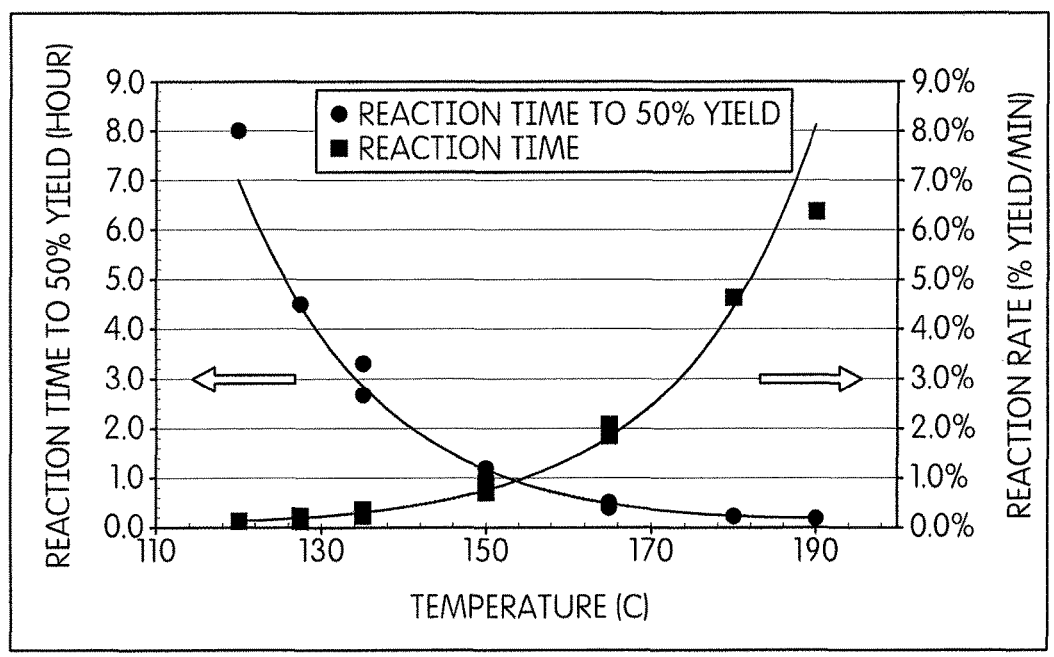
FIG. 3 shows the effect of temperature on the reaction time to 50% yield and on the reaction rate, under certain illustrative extraction conditions.

The same formulation and procedure was used for all the reactions in FIG. 3, with temperature as the only changing parameter. The reaction speed increased drastically with increasing temperature. Accordingly, the reaction time required to reach 50% yield was reduced.

The reactor had to pass high pressure (300 psi) and high temperature (250° C.) tests before using.

These results not only revealed the options to select reactor type, but also provided the possibility of determining how much product was generated in what temperature range as long as the temperature profile of the reaction is available.

Further studies employed a batch process and were carried out at lower temperatures (135-150° C.). A cylinder reactor, as shown in FIG. 4, was used, which permitted easy operation and the use of either wet or dry corn fiber without grinding (as is).

The details of the batch procedure are as follows:
(1) Mix 136 g wet corn fiber (25% dry solid) with 290 g of DI water in a 600-ml beaker.
(2) Adjust to preselected pH with 8% phosphoric acid or 5% sodium hydroxide solution.
(3) Tighten the small end of reactor.
(4) Fill the slurry into the reactor through the big opening and seal it.
(5) Fill into the reactor and attach pressure gauge and relief valve to it.
(6) Weigh and record the total weigh of reactor (original weight).
(7) Put the reactor into preheated Roller Oven.
(8) Take the reactor out of the oven after predesignated time.
(9) Submerge into an ice-water batch and cool it to lower than 40° C.
(10) Weigh the reactor and compare it with original one (the weight difference should less than 2 g to ensure there was no leak during reaction).
(11) Filter the product using a Buchner funnel with #1 filter paper.
(12) Disperse the fiber cake on the Buchner funnel into 400-ml water and stir it for about 10 minutes and filter it again.
(13) Measure the solid contents of $1^{st}$ and $2^{nd}$ filtrate using a forced-air oven at 105° C. for 1.5 hours.
(14) Add the insoluble cake in a weighed stainless steel pan and dry it at 105° C. for 1.5 hours.
(15) Weigh the pan again to calculate the weight of insoluble material (fiber).
(16) Calculate the yield by the solid content of $1^{st}$ filtrate and verify it by mass balance.

The fiber content of the corn fiber/water mixture was kept constant at 8% (based on solids content of the corn fiber). The key parameters included initial pH, temperature, and reaction time (yield). The yield was controlled by reaction time and varied with changing pH and temperature. Reactions with changing parameters were done to show the effect of these parameters, as shown in the following Figures.

Initial pH was adjusted by adding acid or base and the amount depended on the desired preselected value. Since the pH of the destarched corn fiber used as a starting material varied to some extent batch to batch, the added amount of acid or base was varied somewhat accordingly.

It should be noted that the pH of the reaction system (corn fiber/aqueous medium mixture) changes during reaction due to the generation of a small amount of acid. Since the buffer effect of the reaction system was very weak, even a small amount of weak acid could change the pH drastically. As shown in FIG. 5, whatever that initial pH was, the final pH was always acidic.

Figure 6:
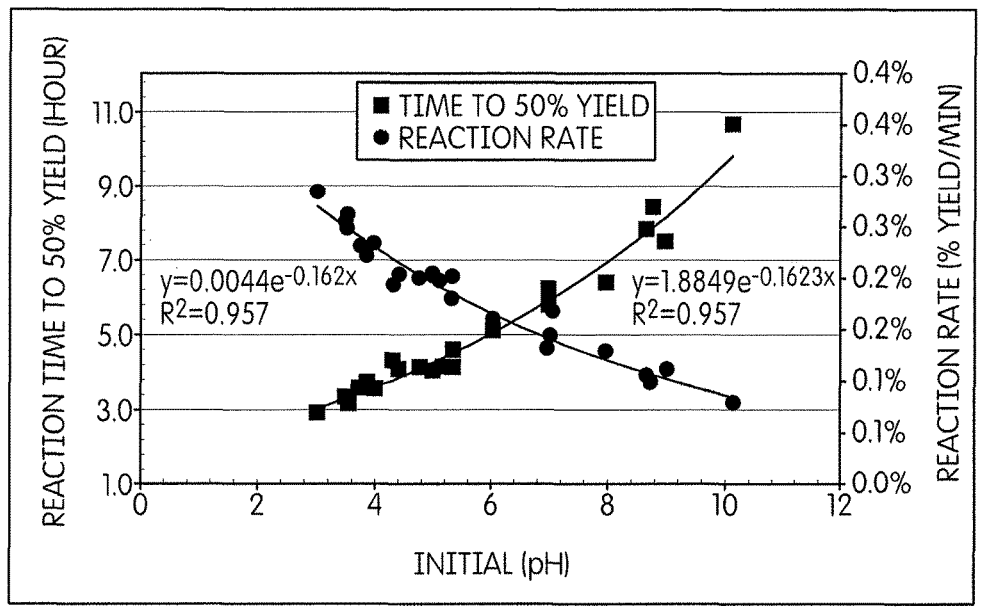
FIG. 6 shows the relationship between initial pH and the rate of reaction/extraction for certain exemplary conditions.

The initial pH was found to play an important role in the reaction speed (FIG. 6) and the properties of the final extracted product. Thus, adjusting initial pH to a particular preselected value ensures that the reaction/extraction takes place under the same conditions no matter what source or batch of corn fiber is used to prepare an arabinoxylan oligosaccharide extract. This is an important step to achieving good product quality and reproducibility (quality control).

Figure 7:
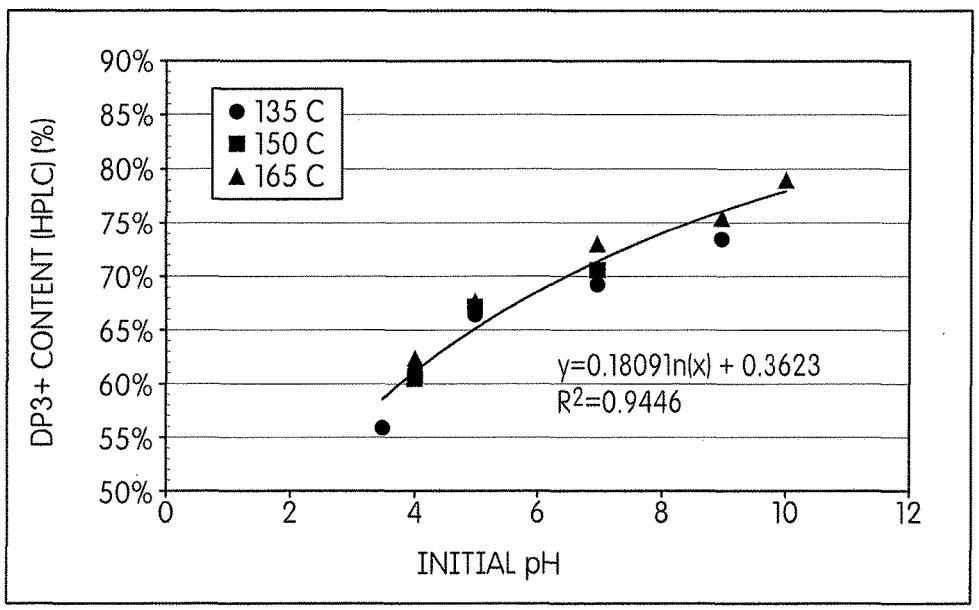
FIG. 7 shows the effect of the initial pH value on the arabinoxylan oligosaccharide content of a product extracted from corn fiber at different extraction temperatures.

FIG. 7 shows that the rate at which the arabinoxylan present in the corn fiber starting material undergoes hydrolysis and solubilization into an aqueous medium during extraction in accordance with the present invention increases significantly with increasing extraction temperature. FIG. 7 also illustrates the effect of the initial pH on the arabinoxylan oligomer (DP3 and higher) content of the extracted (solubilized) product, as calculated on a dry solids basis. In general, a higher initial pH was found to result in a higher arabinoxylan oligosaccharide content in the product.

Figure 8:
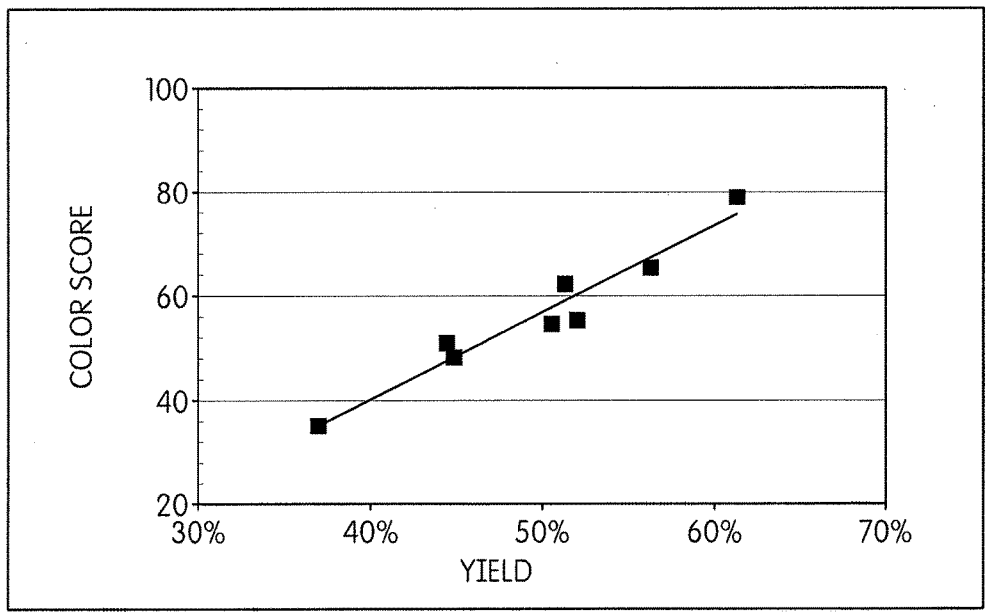
FIG. 8 shows the relationship between the yield of water-soluble product and the color of the extracted product.

FIG. 8 shows the relationship between the yield of water-soluble product (% of soluble product based on the initial loading of corn fiber) and the color of the extracted product. The extractions were carried out in a batch-wise process at 135° C. and an initial pH of 4. As the % yield increased, the product obtained became darker in color.

Figure 9:
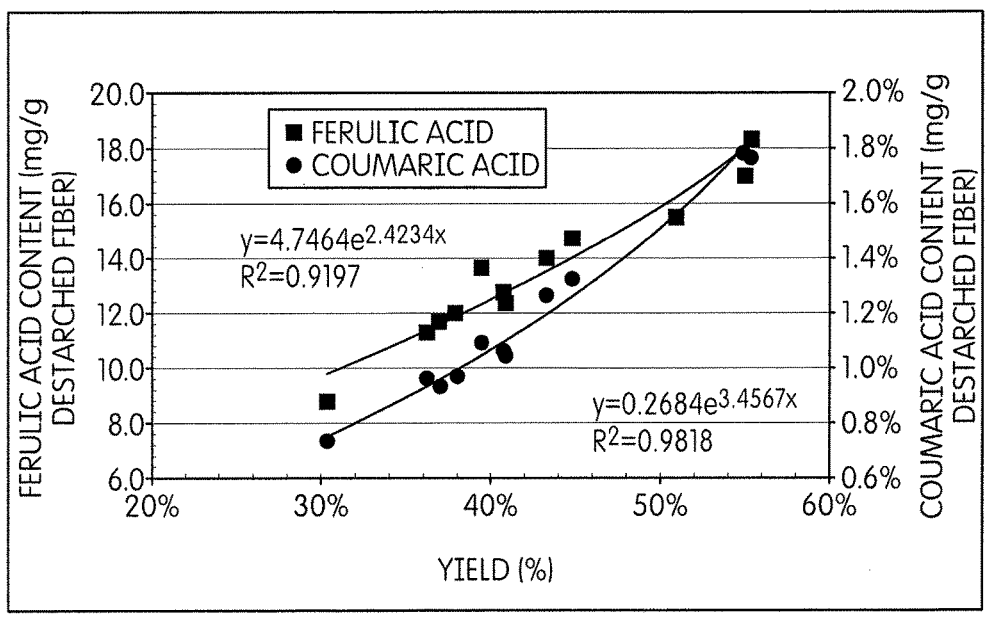
FIG. 9 shows the relationship between the phenolic content of an extracted product and the conditions used to obtain the extracted product.

FIG. 9 shows that the antioxidant (ferulic acid, coumaric acid) content of the extracted product increased as the yield of extracted product was increasing by varying the extraction conditions utilized.

As shown below in Table 1, nearly all of the ferulic acid in the extraction product remained covalently bonded to the arabinoxylan oligosaccharide (AXOS).

TABLE 1

| | Free and Bonded Ferulic acid in AXOS | | |
|---|---|---|---|
| ID | A | B | C |
| Total FA mg/g DSF | 18.31 | 14.80 | 11.45 |
| Free FA mg/g DSF | 0.56 | 0.45 | 0.42 |
| Bound FA % | 97.0% | 97.0% | 96.3% |

Bound FA = (Total FA − Free FA)/Total FA
DSF: De-starched Fiber

What is claimed is:

1. A method of isolating a food grade arabinoxylan product from corn fiber, wherein the method comprises in sequential order the steps of a) mixing a corn fiber with an aqueous medium to form an aqueous mixture of corn fiber, b) measuring the pH of the aqueous mixture of corn fiber, c) determining whether the measured pH of the aqueous mixture of corn fiber corresponds to a preselected initial pH value, wherein the preselected initial pH value of the aqueous mixture of corn fiber is from 4 to 6, d) if the measured pH does not correspond to the preselected initial pH value, adding an amount of acid or base to the aqueous mixture of corn fiber effective to bring the measured pH into correspondence with the preselected initial pH value, wherein the amount of acid or base is not more than 0.1% by weight based on the weight of the aqueous mixture of corn fiber, e) heating the aqueous mixture of corn fiber for a time and at a temperature effective to extract arabinoxylan oligosaccharide into the aqueous medium from the corn fiber such that at least 80% of the ferulic acid extracted into the aqueous medium is covalently bonded to the arabinoxylan oligosaccharide, and f) separating the aqueous medium containing extracted arabinoxylan oligosaccharide from the corn fiber.

2. The method of claim 1, wherein the method is carried out in a batch manner.

3. The method of claim 1, wherein the heating is conducted at a temperature of from about 130° C. to about 160° C.

4. The method of claim 1, wherein the corn fiber is destarched corn fiber.

5. The method of claim 1, wherein the heating step is carried out in a continuous manner.

6. The method of claim 5, wherein the heating is conducted at a temperature of from about 165° C. to about 200° C.

7. The method of claim 1, wherein the separating is accomplished by filtration.

8. The method of claim 1, wherein the corn fiber is in the form of flakes which have not been subjected to either a drying or grinding step.

9. The method of claim 1, comprising a further step of drying the aqueous medium containing extracted arabinoxylan oligosaccharide to provide a solid product.

10. The method of claim 1, wherein no further acid or base is added during step e).

11. The method of claim 1, wherein no catalytic agent other than an acid or base is present during step e).

* * * * *